Oct. 11, 1932.                A. SCHMITT                  1,881,973
                       SCREW PLUG FOR PLASTIC WALLS
                          Filed Dec. 31, 1930
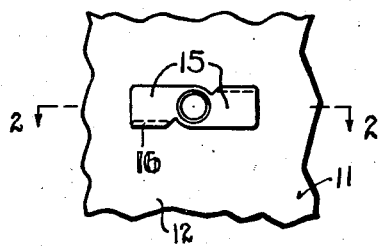
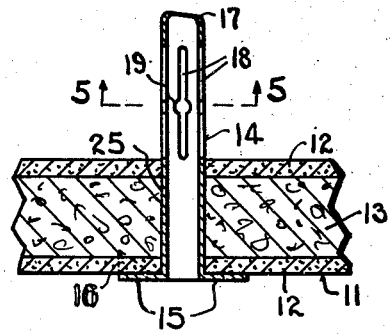
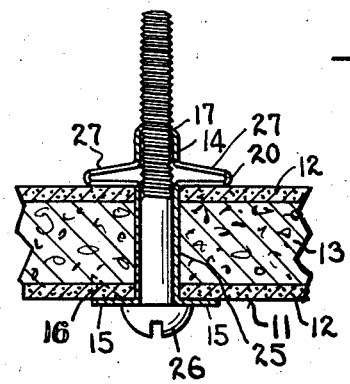
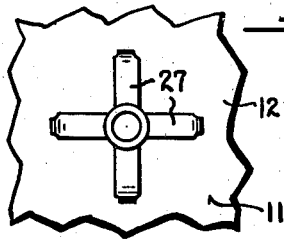
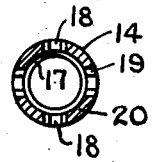
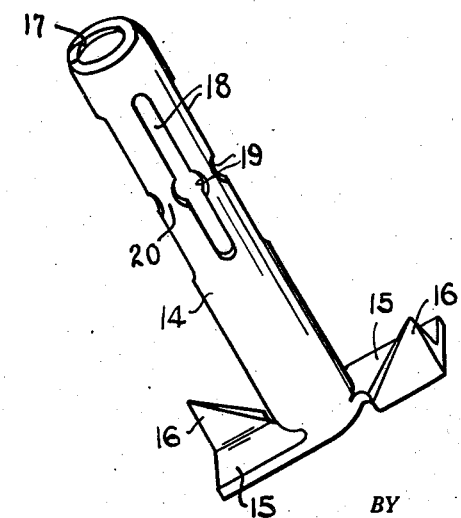
INVENTOR.
ALFRED SCHMITT.
BY
H.C. Kavel.
ATTORNEY.

Patented Oct. 11, 1932

1,881,973

UNITED STATES PATENT OFFICE

ALFRED SCHMITT, OF CINCINNATI, OHIO

SCREW PLUG FOR PLASTIC WALLS

Application filed December 31, 1930. Serial No. 505,843.

In building construction, many walls are made of plaster board or wall board, which usually is a plastic or fiber material on which it is extremely difficult to attach objects with any degree of permanency, due to the inability of the wall board to hold screws or nails.

The object of the present invention is to provide a hollow plug which is firmly held to both sides of the wall, in which suitable screws may be received to secure or support any object it is desired to attach to the wall.

A further object is to provide the plug with means for expanding the portion of the plug extending through the wall and drawing the end of the plug inwardly.

A further object is to provide means for anchoring the plug in the wall.

Still further objects reside in the novel means employed for attaching the plug to the wall and in the novel construction of parts.

The invention will be further readily understood from the following description and claims, and from the drawing, in which latter:

Fig. 1 is a front view of a wall partly broken away, with my invention applied thereto;

Fig. 2 is a horizontal section of the same, taken in the plane of the line 2—2 of Fig. 1;

Fig. 3 is a similar view, with the tube expanded and in clamped position;

Fig. 4 is a rear view of the same;

Fig. 5 is an enlarged cross-section of the same, taken on the line 5—5 of Fig. 2, and Fig. 6 is an enlarged perspective view of the same.

My invention is particularly adapted to be used in connection with walls made of fibrous or plastic materials although it may be used in connection with any type of wall.

In the drawing, I have shown a wall 11 composed of outer layers 12 of fibrous material secured to a plastic material 13.

My device comprises a tubular member 14 provided with flanges 15 bent at right angles to the tube. Opposite ends of the flanges have pointed engaging spurs 16. The other end of the tube has the end cut on a spiral and bent inwardly to form a thread 17. A plurality of slots 18 are cut into the tubular member, having enlarged openings 19 intermediate the length of the slots to form weakened portions 20 in the tube.

In applying my device to a wall, a hole 25 is drilled through the wall to permit insertion of the tubular shank. The spurs 16 are imbedded in the wall to prevent the tube from turning. A screw 26 engages the threaded end 17. Rotation of the screw will draw the end of the tube inwardly causing it to bend at the weakened portion 20 forming anchoring arms 27. The screw is then removed and any desired object can be attached to the wall by means of a similar screw.

My device forms an easy means of firmly attaching objects to a wall and can be adapted to be applied to walls of various thicknesses with slight changes in the length of the tube.

Having thus fully described my invention, what I claim as new and desire to secure by Letters Patent, is:

1. In a device of the character described, comprising a tubular member, flanges bent crosswise thereof at one end and having spurs at their outer ends, said tubular member being spirally cut and bent inwardly to form a thread at the other end, a series of slots lengthwise said tubular member forming strips therebetween and means for bulging said strips outwardly.

2. In a device of the character described, comprising a tubular member provided with flanges at one end and being spirally cut and bent inwardly to form a threaded portion at the other end, spurs extending from said flanges toward said tubular member, a plurality of slots extending lengthwise said tubular member, a screw extending through said tubular member engaging said threaded end for expanding said tubular member adjacent said slots.

3. In a device of the character described, comprising a tubular member, one end of said tubular member provided with flanges bent at right angles thereto, engaging spurs extending from said flanges, the other end of said tubular member being spirally cut and bent inwardly to form a thread, said tubular member provided with slots extending lengthwise thereof forming strips in said member, said strips having weakened portions intermediate their length, means for drawing said threaded portion inwardly causing said strips to bulge outwardly for locking said member to a wall.

In testimony whereof, I have hereunto signed my name.

ALFRED SCHMITT.